UNITED STATES PATENT OFFICE 2,417,235

DRILLING FLUID

George E. Cannon, Houston, Tex., assignor to Standard Oil Development Company, a corporation of Delaware No Drawing. Application May 10, 1943, Serial No. 486,423

2 Claims. (Cl. 252—8.5)

The present invention is directed to an aqueous drilling fluid.

It has already been proposed to use gelatinized starch as an agent for preventing water loss by filtration from drilling fluids composed of aqueous suspensions of mineral solids. Attempts to use this material in fresh water drilling fluids have not been as satisfactory as desired by reason of a tendency of the starch to ferment. In fact, to make the use of starch in fresh water mud at all feasible, it is necessary to build up a concentration of an electrolyte in the drilling fluid to a point sufficient to inhibit starch fermentation. This adds to the cost of the drilling fluid and also complicates the treating problem.

According to the present invention, water loss by filtration in fresh water drilling fluids is effectively inhibited by incorporating in the drilling fluid a starch ester. The most readily available ester for this purpose is the acetate, although any of the numerous well known starch esters, such as the propionate, butyrate, caproate, benzoate, phthalate, etc., may be employed. These esters exhibit the same effectiveness as gelatinized starch, itself, in the prevention of water loss by filtration, and at the same time do not have any tendency to ferment, particularly when the content of caustic in the drilling fluid is not unduly increased. One of the advantages of using this material is that it renders unnecessary the addition of substances like caustic which previously were employed in conjunction with starch to minimize fermentation and to help control viscosity.

The proportions in which these starch esters are employed in drilling fluids are of the same order of magnitude as those conventional in the use of starch, itself. As in the case of starch, these esters may be used in conjunction with other mud-conditioning agents such as mud heaviers and viscosity regulating agents. Preferably, the material is employed in finely divided form. A satisfactory particle size is one which will pass through a standard 300-mesh screen, although other particle sizes common in the art may be employed, the principal objective being to avoid the use of the material in lump form.

The nature and objects of the present invention having been described, what I wish to claim as new and useful and secure by Letters Patent is:

1. A method for reducing water loss by filtration in drilling fluid including a suspension of solid mineral matter in water which comprises suspending a water-soluble starch ester of a low molecular weight aliphatic acid in said fluid.

2. A method for reducing water loss by filtration in a fresh water drilling fluid including solid mineral matter suspended in fresh water which comprises suspending a water-soluble starch ester of a low molecular weight aliphatic acid in said fluid.

GEORGE E. CANNON.

REFERENCES CITED

The following references are of record in the file of this patent:

UNITED STATES PATENTS

| Number | Name | Date |
|---|---|---|
| 1,959,590 | Lorand | May 22, 1934 |
| 2,209,591 | Barnes | July 30, 1940 |
| 2,340,338 | Murray | Feb. 1, 1944 |
| 2,365,173 | Caesar | Dec. 19, 1944 |

FOREIGN PATENTS

| Number | Country | Date |
|---|---|---|
| 239,726 | British | Sept. 17, 1925 |

OTHER REFERENCES

A. P. C. Application of Lolkema, 380,562, April 20, 1943.

Stern—Role of Clay and Other Minerals in Oil-Well Drilling Fluids—Report of Investigations No. 3556 of Bureau of Mines, pp. 76 and 77, Feb. 1941.

The Condensed Chemical Dictionary, 3rd edition, page 602, pub. 1902 by Reinhold Pub. Corp. of New York. (Copy in Div. 64.)